United States Patent
Kamikakai et al.

[19]

[11] Patent Number: 6,154,359
[45] Date of Patent: *Nov. 28, 2000

[54] PORTABLE INFORMATION PROCESSING APPARATUS

[75] Inventors: Hideaki Kamikakai; Katsuichi Goto, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/962,394

[22] Filed: Oct. 31, 1997

[30] Foreign Application Priority Data

Dec. 2, 1996 [JP] Japan ................................. 8-321975

[51] Int. Cl.$^7$ .............................. G06F 1/16; E05D 11/00
[52] U.S. Cl. .............................. 361/681; 16/342; 16/366; 361/680
[58] Field of Search .................................. 361/680, 681, 361/683; 364/708.1; 16/342, 366

[56] References Cited

U.S. PATENT DOCUMENTS

| | | |
|---|---|---|
| 4,825,395 | 4/1989 | Kinser, Jr. et al. . |
| 4,842,531 | 6/1989 | Takemura .............................. 439/163 |

(List continued on next page.)

FOREIGN PATENT DOCUMENTS

| | | | |
|---|---|---|---|
| 201150 | 2/1939 | Australia ................................. | 16/366 |
| 0 248 156 | 12/1987 | European Pat. Off. . | |
| 0 458 316 | 11/1991 | European Pat. Off. . | |
| 42 28 605 | 3/1994 | Germany . | |
| 297 01 721 U | 5/1997 | Germany . | |
| 62-006298 | 1/1987 | Japan . | |
| 62-017786 | 1/1987 | Japan . | |
| 63-045619 | 2/1988 | Japan . | |
| 63-40957 | 2/1988 | Japan . | |
| 63-128409 | 6/1988 | Japan . | |
| 1-237808 | 9/1989 | Japan . | |
| 2-76775 | 6/1990 | Japan . | |

(List continued on next page.)

OTHER PUBLICATIONS

Hewlett Packard Part No. F1310–90001, "HP OmniGo 100: Quick Start and User's Reference Guide", Edition 1, Sep. 1995.
Nikkei Sangyo Shimbun, Nov. 26, 1996, "Portable Personal Computer".
Nihon Keizai Shimbun, Nov. 26, 1996, "Developed Network available Portable PC".
Business Computer News, Dec. 2, 1996, "30,000 Visitors to Fujitsu 'Cyberspace World'".
ASCII, A Monthly Magazine of Home & Office Computer Science. vol. 21, No. 1, Jan. 1997, "Quick Perfect Report on New Machines from Fujitsu".
Nikkan Kogyo Shimbun, Jun. 4, 1997, "Entering the Market for Portable Information Terminals—Fujitsu Low-priced A5 Size".

Primary Examiner—Leo P. Picard
Assistant Examiner—Lisa Lea-Edmonds
Attorney, Agent, or Firm—Staas & Halsey LLP

[57] ABSTRACT

A portable electronic device has a main body, a display part having a display panel, and a connection part having a first rotary part respectively connected to and rotatably interconnecting a second rotary part and supporting the main body and the display part relatively to each other. The first rotary part maintains a fixed angular relationship between the main body and the connection part and permits adjustment of the angle therebetween when a first rotary manipulation force is applied therebetween which exceeds a rotary manipulation force due to the weight of the main body itself. The second rotary part maintains a fixed angular relationship between the main body and the connection part and permits adjustment of the angle between the display part and the connector when a second rotary manipulation force is applied therebetween which exceeds a rotary manipulation force due to the weight of the main body itself.

23 Claims, 9 Drawing Sheets

U.S. PATENT DOCUMENTS

| | | | |
|---|---|---|---|
| 4,846,536 | 7/1989 | Saitou et al. | 312/72 |
| 4,878,293 | 11/1989 | Kinser, Jr. et al. . | |
| 4,885,430 | 12/1989 | Kinser, Jr. et al. . | |
| 4,918,632 | 4/1990 | York | 364/708 |
| 4,960,256 | 10/1990 | Chihara et al. | 248/284 |
| 4,961,126 | 10/1990 | Suzuki | 361/398 |
| 4,976,007 | 12/1990 | Lam | 16/342 |
| 4,996,522 | 2/1991 | Sunano | 361/680 |
| 5,052,078 | 10/1991 | Hosoi | 16/342 |
| 5,077,551 | 12/1991 | Kinser, Jr. et al. . | |
| 5,109,354 | 4/1992 | Yamashita et al. | 364/708 |
| 5,126,725 | 6/1992 | Yanagisawa | 361/681 |
| 5,128,829 | 7/1992 | Loew | 361/380 |
| 5,206,790 | 4/1993 | Thomas et al. | 361/681 |
| 5,251,102 | 10/1993 | Kimble | 361/680 |
| 5,268,817 | 12/1993 | Miyagawa et al. | 361/729 |
| 5,278,725 | 1/1994 | Konno et al. . | |
| 5,282,293 | 2/1994 | Pedoeem | 16/342 |
| 5,337,212 | 8/1994 | Bartlett et al. | 361/681 |
| 5,359,550 | 10/1994 | Chen | 364/708.1 |
| 5,375,076 | 12/1994 | Goodrich et al. | 364/708.1 |
| 5,383,138 | 1/1995 | Motoyama et al. | 361/683 |
| 5,410,447 | 4/1995 | Miyagawa et al. | 361/681 |
| 5,436,792 | 7/1995 | Leman et al. | 361/686 |
| 5,481,430 | 1/1996 | Miyagawa et al. | 361/681 |
| 5,500,982 | 3/1996 | Hosoi | 16/342 |
| 5,548,478 | 8/1996 | Kumar et al. | 361/681 |
| 5,555,157 | 9/1996 | Moller et al. | 361/683 |
| 5,594,619 | 1/1997 | Miyagawa et al. | 361/681 |
| 5,644,516 | 7/1997 | Podwalny et al. | 364/708.1 |
| 5,666,694 | 9/1997 | Slow et al. | 16/368 |
| 5,712,760 | 1/1998 | Coulon et al. | 361/681 |
| 5,719,799 | 2/1998 | Isashi . | |
| 5,898,600 | 4/1999 | Isashi . | |

FOREIGN PATENT DOCUMENTS

| | | |
|---|---|---|
| 4-25926 | 1/1992 | Japan . |
| 4-25928 | 1/1992 | Japan . |
| 4-43420 | 2/1992 | Japan . |
| 4-109330 | 4/1992 | Japan . |
| 4-315250 | 11/1992 | Japan . |
| 5-173668 | 7/1993 | Japan . |
| 5-242040 | 9/1993 | Japan . |
| 5-265590 | 10/1993 | Japan . |
| 5-289774 | 11/1993 | Japan . |
| 8-22343 | 1/1996 | Japan . |
| 9-130058 | 5/1997 | Japan . |
| 2 283 531 | 5/1995 | United Kingdom . |
| 91/05327 | 4/1991 | WIPO . |
| 93/01700 | 1/1993 | WIPO . |
| 95/00406 | 1/1995 | WIPO . |

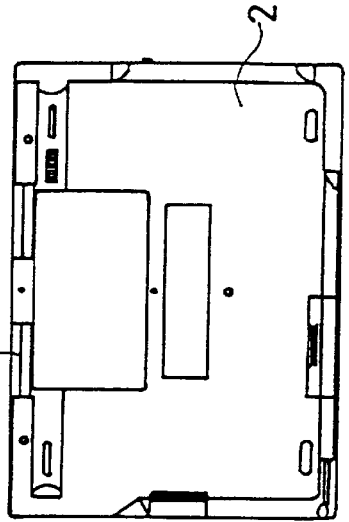
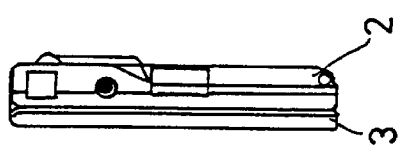
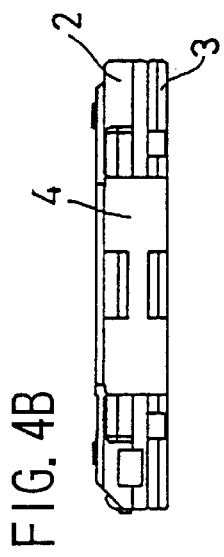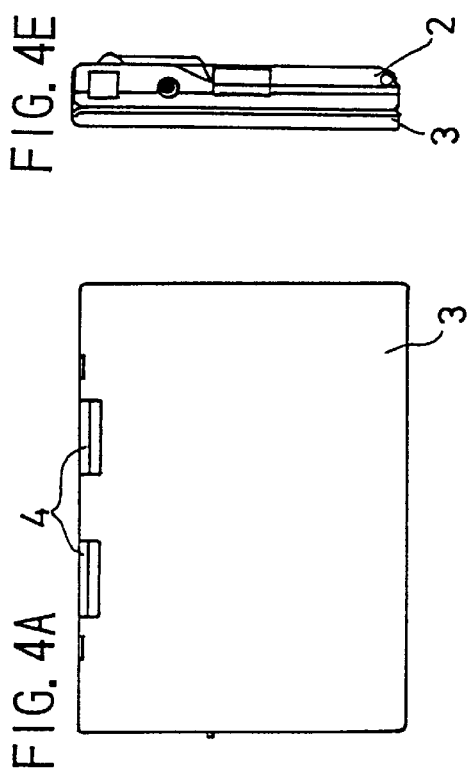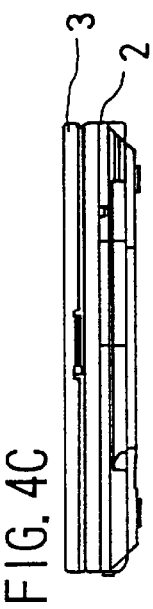
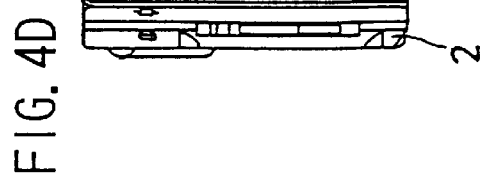

PORTABLE INFORMATION PROCESSING APPARATUS

BACKGROUND OF THE INVENTION

The present invention generally relates to portable information processing apparatuses and, more particularly, to an information processing apparatus having a display part which includes a display panel and a pen input part formed on the display panel, a main body which includes a keyboard, and a connection part which connects the display part and the main body.

Recently, portable information processing apparatuses typified by lap-top and palm-top computers have become popular due to the ease with which the portable information apparatuses can be carried by the user. With respect to such portable information processing information apparatuses, there are demands to reduce the size of the apparatus and to simultaneously realize easy operation under various environments.

FIG. 1 is a perspective view showing an example of a conventional portable information processing apparatus. In addition, FIG. 2 is a cross sectional view for explaining the conventional portable information processing apparatus shown in FIG. 1 in a folded state.

A portable information processing apparatus 51 shown in FIG. 1 generally includes a display part 53 made up of a liquid crystal display panel 52 and a pen input part 58 formed on the liquid crystal display panel 52, a main body 55 having a keyboard 54 for inputting data, and a connection part 56. The display part 53 is connected to the main body 55 via the connection part 56.

Normally, when using the portable information processing apparatus 51 and inputting data, for example, the display part 53 is opened to an open position indicated by a dotted line in FIG. 2 so that the user can see the liquid crystal display panel 52 as shown in FIG. 1 when manipulating the keyboard 54.

On the other hand, when the user carries the portable information processing apparatus 51, the display part 53 is closed to a folded position indicated by a solid line in FIG. 2 so that the display part 53 and the keyboard 54 are not exposed to the outside and are protected from external shock. The display part 53 in the folded position also reduces the area of the portable information processing apparatus 51 as a whole, making it easy to carry the portable information processing apparatus 51. Hence, when carrying the portable information processing apparatus 51, the display part 53 is closed with respect to the main body 55 about the connection part 56, so that the display part 53 and the keyboard 54 which are to be protected from the external shock confront each other.

As may be seen from FIG. 2, the connection part 56 enables the display part 53 to be opened to the open position with respect to the main body 55 when using the portable information processing apparatus 51, and to be closed to the folded position with respect to the main body 55 when not using the portable information processing apparatus 51, that is, when carrying the portable information processing apparatus 51. As shown in FIG. 2, the connection part 56 has a single axis structure 57.

Because the connection part 56 has the single-shaft structure 57, the display part 53 can be opened with respect to the main body 55 from the folded position to the open position for an angular range of 180°. If the portable information processing apparatus 51 is provided with a means for locking the display part 53 can be locked at a certain rotary position as shown in FIG. 1 so as to facilitate viewing of the liquid crystal display panel 52.

However, the portable information processing apparatus 51 occupies an area which is larger when the display part 53 is in the open position compared to the case where the display part 53 is in the folded position. For this reason, the portable information processing apparatus 51 is difficult to operate when the portable information processing apparatus 51 is set up on a surface having an area smaller than that of the main body 55, such as when the portable information processing apparatus 51 is used on the user's lap or in the user's palm.

In other words, the portable information processing apparatus 51 in this case is unstable and must be held by the user's hand in order to input data from the keyboard 54 and/or from the pen input part 58 which is formed on the liquid crystal display panel 52 by the user's other hand. Particularly in the state where the display part 53 is opened with respect to the main body 55 to the open position, it is extremely difficult for the user to positively and stably hold the display part 53 of the portable information processing apparatus 51 while inputting the data from the pen input part 58.

SUMMARY OF THE INVENTION

Accordingly, it is a general object of the present invention to provide a novel and useful portable information processing apparatus in which the problems described above are eliminated.

Another and more specific object of the present invention is to provide a portable information processing apparatus which enables easy operation, such as data input from a keyboard and/or a pen input part, even when the portable information processing apparatus is set up on a small surface, such as the user's lap, the user's palm or the like.

Still another object of the present invention is to provide a portable information processing apparatus comprising a main body, a display part having a display panel, and a connection part, having a first rotary part and a second rotary part, supporting the main body and the display part, wherein the first rotary part is linked to the main body so that the connection part and the main body turn relative to each other when a rotary manipulation force greater than a first predetermined value is applied on the main body, and the second rotary part is linked to the display part so that the connection part and the display part turn relative to each other when a rotary manipulation force greater than a second predetermined value is applied on the display part. According to the portable information processing apparatus of the present invention, it is possible to enable easy operation, such as data input from a keyboard and/or a pen input part, even when the portable information processing apparatus is set up on a small surface, the user's lap, the user's palm or the like.

Other objects and further features of the present invention will be apparent from the following detailed description when read in conjunction with the accompanying drawings.

BRIEF DESCRIPTION OF THE DRAWINGS

FIGS. 4A, 4B, 4C, 4D, 4E and 4F respectively are a plan view, a rear view, a front view, a left side view, a right side view and a bottom view of the embodiment of the portable information processing apparatus in a state where a display part is closed with respect to a main body;

DESCRIPTION OF THE PREFERRED EMBODIMENTS

Figure 3:
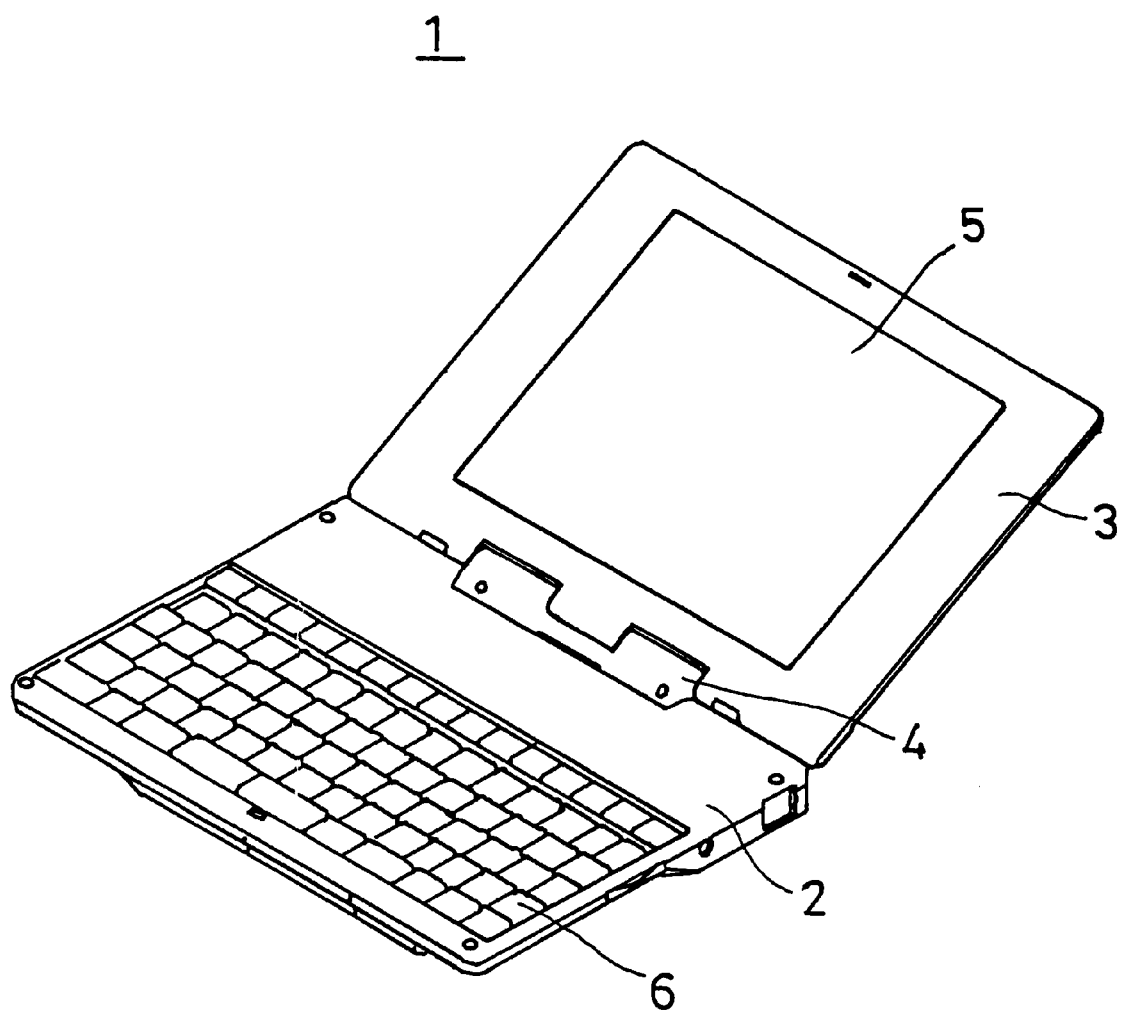
FIG. 3 is a perspective view showing an embodiment of a portable information processing apparatus according to the present invention.

FIG. 3 shows an embodiment of a portable information processing apparatus according to the present invention in a state where a display part is opened with respect to a main body. In addition, FIGS. 4A, 4B, 4C, 4D, 4E and 4F respectively show a plan view, a rear view, a front view, a left side view, a right side view and a bottom view of the portable information processing apparatus shown in FIG. 3 in a state where the display part is closed with respect to the main body. Furthermore, FIG. 5 shows a cross section of an internal structure of the portable information processing apparatus shown in FIG. 3 in the state where the display part is closed with respect to the main body.

Figure 5:
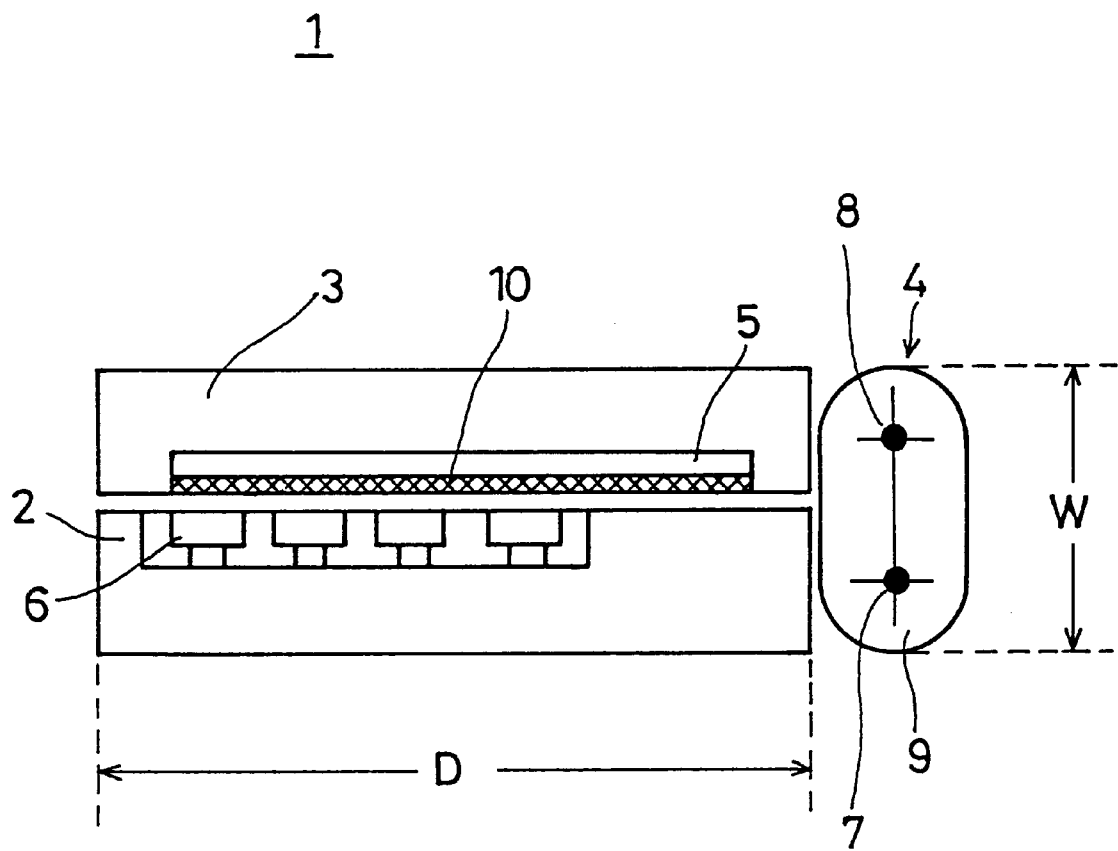
FIG. 5 is a cross sectional view showing the internal structure of the embodiment of the portable information processing apparatus.

As shown in FIGS. 3 through 5, a portable information processing apparatus 1 generally includes a main body 2, a display part 3 which can open and close with respect to the main body 2, and a connection part 4. The main body 2 includes a keyboard 6 for inputting data. On the other hand, the display part 3 includes a liquid crystal display panel 5, and a pen input part 10 which is formed on the surface of the liquid crystal display panel 5.

The portable information processing apparatus 1 may be a lap-top computer, a palm-top computer, a notebook type word processor, a portable communication tool such as a communication terminal, or the like.

The display part 3 and the main body 2 are connected via the connection part 4. The connection part 4 is linked to related ends or edges, of the display part 3 and the main body 2 which confront each other in a folded or closed state of the display part 3. The connection part 4 includes a first rotary part 7 and a second rotary part 8. The first rotary part 7 is linked to the main body 2, and enables turning of the main body 2 when a rotary manipulation force greater than or equal to a predetermined value is applied on the main body 2. On the other hand, the second rotary part 8 is linked to the display part 3, and enables turning of the display part 3 when a rotary manipulation force greater than or equal to a predetermined value is applied on the display part 3.

Figure 6A:
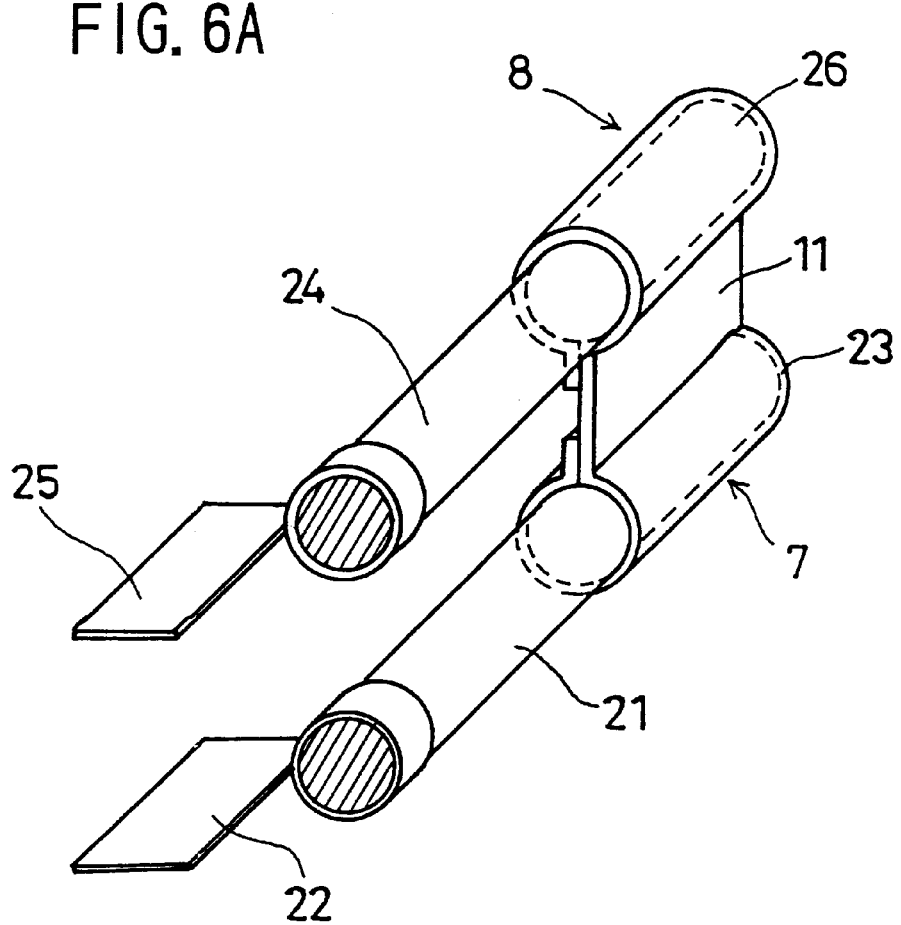
FIGS. 6A and 6B respectively are a disassembled perspective view and a cross sectional view showing important parts of a connection element.
Figure 6B:
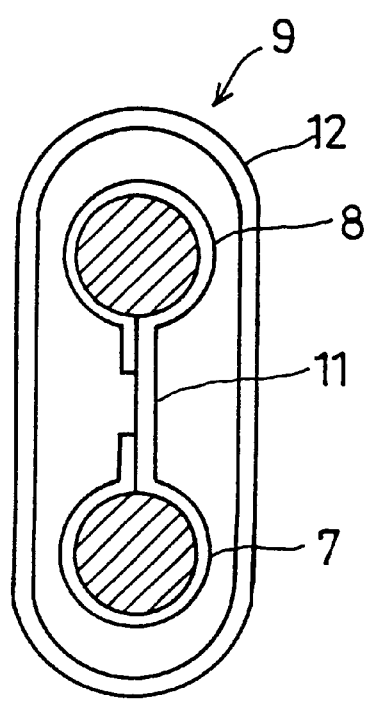

FIGS. 6A and 6B respectively are diagrams generally showing the construction of important parts of the connection part 4. More particularly, FIG. 6A shows a disassembled perspective view of an important part of the connection part 4, and FIG. 6B shows a cross sectional view of an important part of the connection part 4.

As shown in FIG. 6B, the connection part 4 includes a support part 9, which supports the first and second rotary parts 7 and 8. The support part 9 is made up of a plate-shaped member 11 which connects and supports the first and second rotary parts 7 and 8, and a cover 12 which covers and protects the first and second rotary parts 7 and 8.

The first rotary part 7 includes a rotary shaft 21 and a pipe-shaped bearing member 23. A part of the rotary shaft 21 is mounted on the main body 2 via a mounting part 22. The bearing member 23 supports the rotary shaft 21 in a rotatable state where the rotary shaft 21 firmly fits into the bearing member 23. Hence, friction exists between the inner peripheral surface of the bearing part 23 and the outer peripheral surface of the rotary shaft 21. By this friction, a rotary torque (or rotation-decelerating moment), is generated so as to interfere with (i.e., restrain or impede the rotation of the rotary shaft 21 when the main body 2 is turned and the rotary shaft 21 turns. The rotary torque is set greater than a rotary force owing to the weight of the main body 2 itself, but less than a rotary manipulation force which is applied on the main body 2 when the main body 2 is turned by the user's hand.

On the other hand, the second rotary part 8 includes a rotary shaft 24 and a pipe-shaped bearing member 26. A part of the rotary shaft 24 is mounted on the display part 3 via a mounting part 25. The bearing member 26 supports the rotary shaft 24 in a rotatable state where the rotary shaft 24 firmly fits into the bearing member 26. Hence, friction exists between the inner peripheral surface of the bearing part 26 and the outer peripheral surface of the rotary shaft 24. By this friction, a rotary torque (or rotation-decelerating moment) is generated so as to interfere with i.e., restrain or impede the rotation of the rotary shaft 24 when the display part 3 is turned and the rotary shaft 24 turns. The rotary torque is set greater than a rotary force owing to the weight of the display part 3 itself, but less than a rotary manipulation force which is applied on the display part 3 when the display part 3 is turned by the user's hand.

The bearing members 23 and 26 and the plate-shaped member 11 are formed from a single metal plate which is bent to form the members 23, 26 and 11 as shown in FIG. 6A. The single metal plate is bent to form two pipe-shaped portions which form the bearing members 23 and 26, and ends of the single metal plate is soldered in a vicinity of a center of the plate-shaped member 11. The inner diameter of the pipe-shaped portions are adjusted so that the rotary shaft 21 fits into and is supported by the bearing member 23 without a gap, and the rotary shaft 24 fits into and is supported by the bearing member 26 without a gap. As a result, friction exists between the outer peripheral surface of the rotary shaft 21 and the inner peripheral surface of the bearing member 23, and friction similarly exists between the outer peripheral surface of the rotary shaft 24 and the inner peripheral surface of the bearing member 26.

By the above described construction of the first rotary part 7, the rotary shaft 21 will not rotate if the rotary manipulation force applied on the main body 2 or the connection part 4 is less than a predetermined rotary force. The rotary shaft 21 rotates only when the rotary manipulation force applied on the main body 2 or the connection part 4 is greater than or equal to the predetermined rotary force, and in this case, the main body 2 or the connection part 4 turns as the rotary shaft 21 turns.

When the user stops turning the main body 2 or stops turning the connection part 4 with respect to the main body 2, the main body 2 or the connection part 4 stops turning due to the friction between the bearing member 23 and the rotary shaft 21. An angle formed between the main body 2 and the connection part 4 is fixed to that at the time when the rotary manipulation force is released, and the main body 2 and the connection part 4 are supported at this angular position.

In addition, because the second rotary part 8 has a construction similar to that of the first rotary part 7, the rotary shaft 24 will not rotate if the rotary manipulation force applied on the display part 3 or the connection part 4 is less than a predetermined rotary force. The rotary shaft 24 rotates only when the rotary manipulation force applied on the display part 3 or the connection part 4 is greater than or equal to the predetermined rotary force, and in this case, the display part 3 or the connection part 4 turns as the rotary shaft 24 turns.

When the user stops turning the display part 3 or stops turning the connection part 4 with respect to the main body 2, the display part 3 or the connection part 4 stops turning due to the friction between the bearing member 26 and the rotary shaft 24. An angle formed between the display part 3 and the connection part 4 is fixed to that at the time when the rotary manipulation force is released, and the display part 3 and the connection part 4 are supported at this angular position.

Next, a description will be given of the various positions the display part 3 can take with respect to the main body 2 due to the double-shaft structure of the connection part 4.

As shown in FIG. 5, the portable information processing apparatus 1 is normally carried by the user in a state where the display part 3 is folded, that is, closed, with respect to the main body 2. In this state, the display part 3 is stacked on top of the main body 2 so that the liquid crystal display panel 5 (pen input part 10) confronts the keyboard 6. In this state, an angle formed between the display part 3 and the main body 2 is 0°. In this state where the angle formed between the display part 3 and the main body 2 is 0°, an angle formed between the display part 3 and the connection part 4 is 90°, and an angle formed between the main body 2 and the connection part 4 is also 90°. Since the connection part 4 has the double-shaft structure, the display part 3 and the main body 2 can turn independently of each other, and both the display part 3 and the main body 2 can be turned to arbitrary rotary positions.

Figure 7:
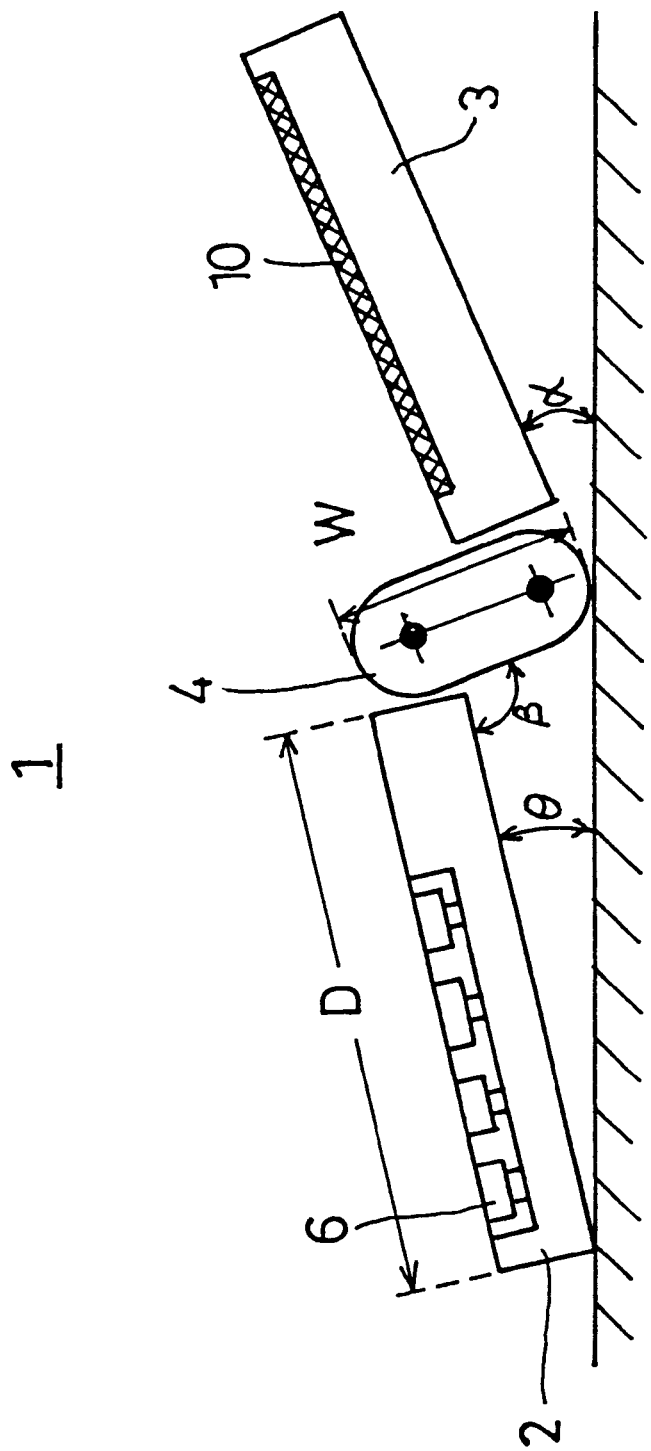
FIG. 7 is a cross sectional view showing the embodiment of the portable information processing apparatus in a state where only the main body is turned with respect to the display part and the connection part.

FIG. 7 shows a cross section of the portable information processing apparatus 1 in a state where only the main body 2 is turned with respect to the display part 3 and the connection part 4.

In FIG. 7, the main body 2 is turned by approximately 180° with respect to the display part 3 and the connection part 4. When the portable information processing apparatus 1 is set up on a flat set-up surface in this state, the connection part 4 supports the main body 2 in a tilted state on the flat set-up surface such that the main body 2 forms an angle θ to the flat set-up surface.

The angle θ is determined by a width D of the main body 2, a width W of the connection part 4 which is approximately the same as the thickness of the portable information processing apparatus 1, and an angle β which is determined by the extent of the turn of the main body 2 relative to part 4 and is formed between the main body 2 and the connection part 4. Hence, a tilt angle of the main body 2 with respect to the flat set-up surface can be arbitrarily selected within an angular range of 0° to θ.

In this case, a tilt angle α of the display part 3 with respect to the flat set-up surface can be arbitrarily selected within an angular range of 0° to (θ+β−90°), and the display part 3 can be set to a tilt angle which makes information displayed on the display part 3 easily visible by the user. The maximum tilt angle (θ+β−90°) includes the angle of 90° because in the folded or closed state of the display part 3, the angle formed between the display part 3 and the connection part 4 is 90°.

Therefore, this embodiment enables easy and convenient operation of the keyboard 6 of the main body 2 since the main body 2 can be freely tilted with respect to the set-up surface when the portable information processing apparatus 1 is in use.

Figure 1:
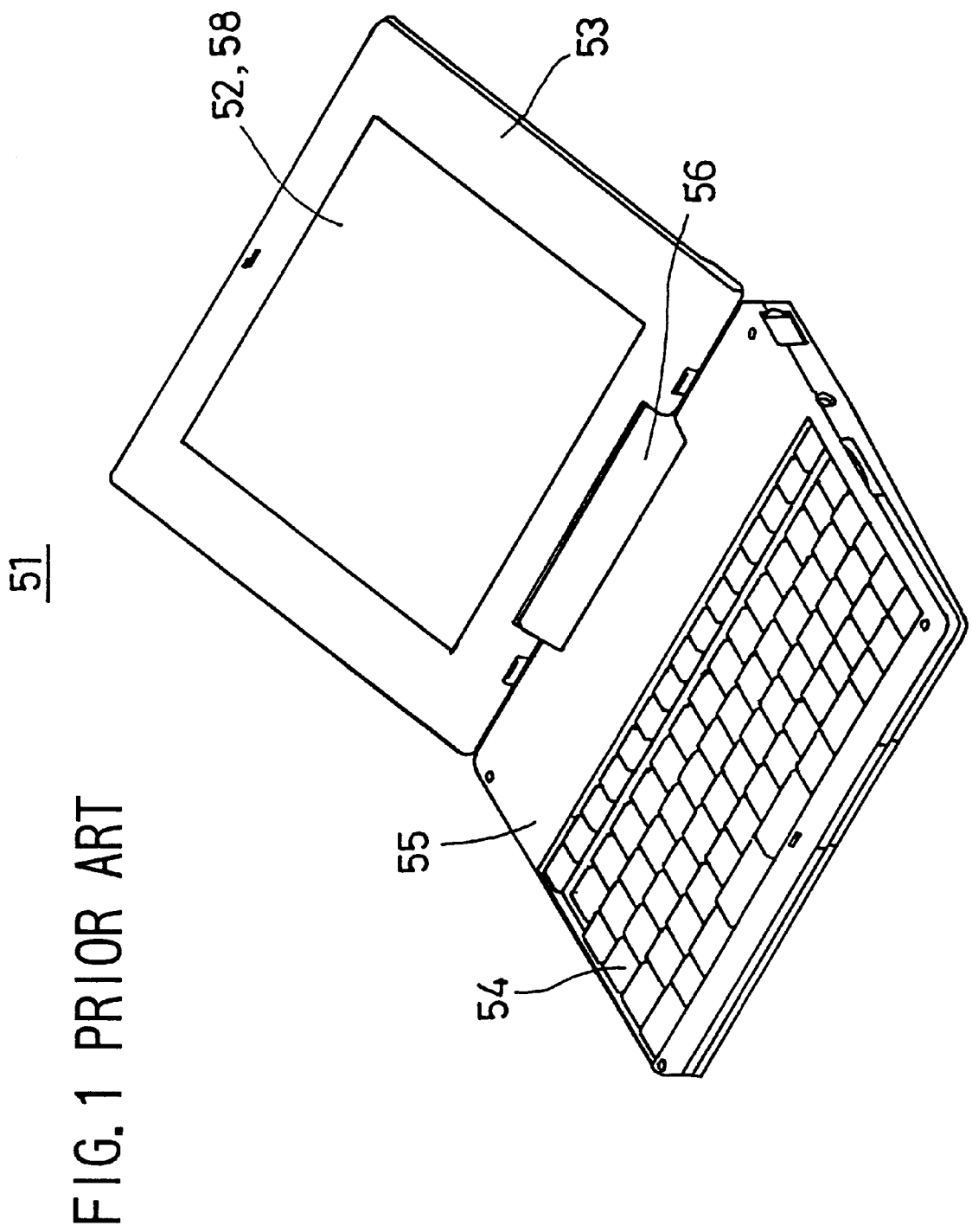
FIG. 1 is a perspective view showing an example of a conventional portable information processing apparatus.
Figure 2:
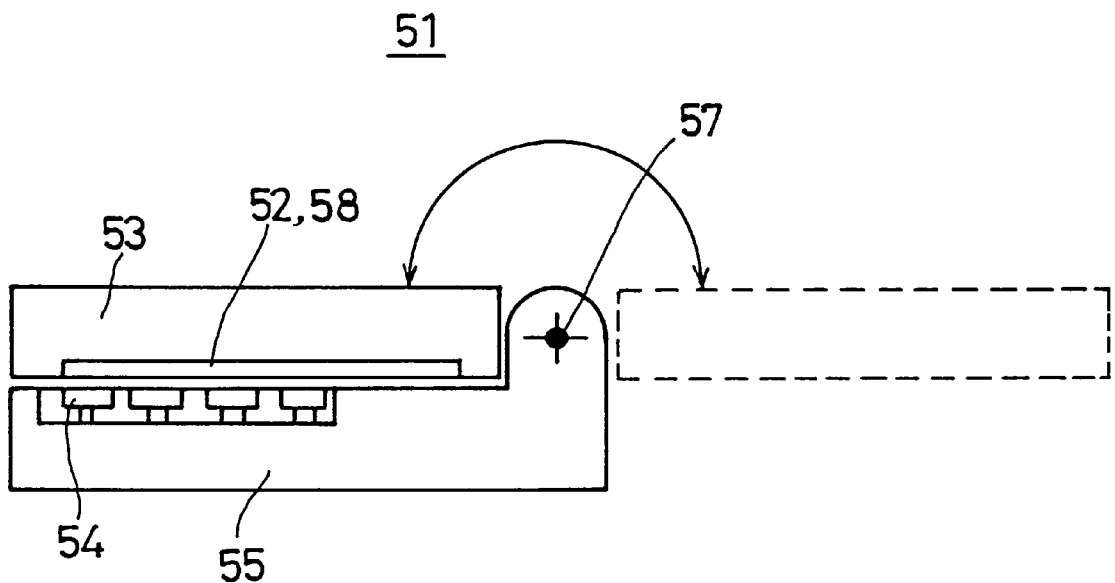
FIG. 2 is a cross sectional view for explaining the conventional portable information processing apparatus shown in FIG. 1 in a folded state.

As may be seen from FIG. 2 described above, the main body 55 of the conventional portable information processing apparatus 51 cannot be tilted unless a special tilting mechanism is additionally provided, because of the single-shaft structure of the connection part 56 used to support the main body 55 and the display part 53. In other words, the single-shaft structure of the connection part 56 makes it impossible to turn one of the main body 55 and the display part 53 with respect to the other by an angle greater than 180°.

Figure 8:
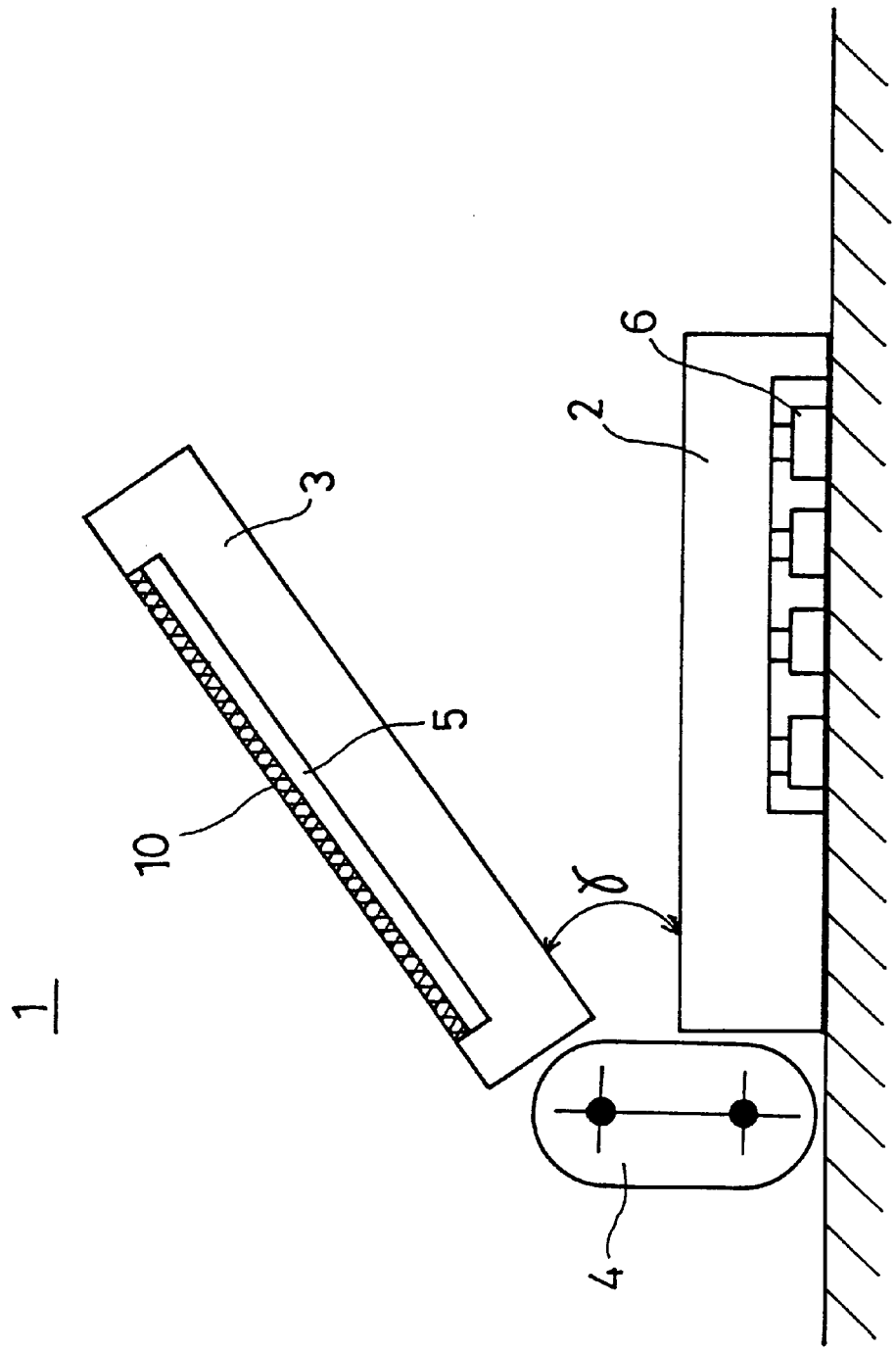
FIG. 8 is a cross sectional view showing the embodiment of the portable information processing apparatus in a state where both the main body and the display part are turned with respect to the connection part.

FIG. 8 shows a cross section of the portable information processing apparatus 1 in a state where both the main body 2 and the display part 3 are turned with respect to the connection part 4.

In FIG. 8, the main body 2 is set up on the flat set-up surface with the keyboard 6 facing down, and the display part 3 and the main body 2 form an angle within an angular range of 270° to 360° in this, state. Hence, an angle γ formed between the surface 3a of the display part 3, opposite to the surface 3b provided with the liquid crystal display panel 5 and the pen input part 10, and the surface 2a of the main body 2, opposite to the surface 2b provided with the keyboard 6, is within an angular range of 0° to 90°.

In this case, the surface 2b of the main body 2, forming the bottom surface of the portable information processing apparatus 1 in the folded state of the display part 3, and the surface 3a of the display part 3, forming the top surface of the portable information processing apparatus 1 in the folded state of the display part 3, face each other as shown in FIG. 8. In addition, the pen input part 10 is easily accessible by the user, because the area occupied by the portable information processing apparatus 1 in this state is not much different from that in the folded state of the display part 3 and the portable information processing apparatus 1 can easily be maintained in a stable state. Accordingly, the user can easily input data from the pen input part 10 by manipulating a pen (not shown) with respect to the pen input part.

Preferably, the portable information processing apparatus 1 is provided with a mechanism for disabling the keyboard 6 when the angle γ formed between the surface, 3a of the display part 3, opposite to the surface 3b provided with the pen input part 10, and the surface 2a of the main body 2, opposite to the surface 2b provided with the keyboard 6, is within an angular range of 0° to 90°, so that the data input is only possible from the pen input part 10. A mechanism similar to a known mechanism for turning OFF power of the portable information processing apparatus 1 when the display part 3 is folded and closed with respect to the main body 2 may be used to disable the keyboard 6. In this case, it possible to prevent erroneous manipulation of the keyboard 6 and to prevent erroneous inputs from the keyboard 6 when making the data input from the pen input part 10 in the position of the portable information processing apparatus 1 shown in FIG. 8.

Figure 9:
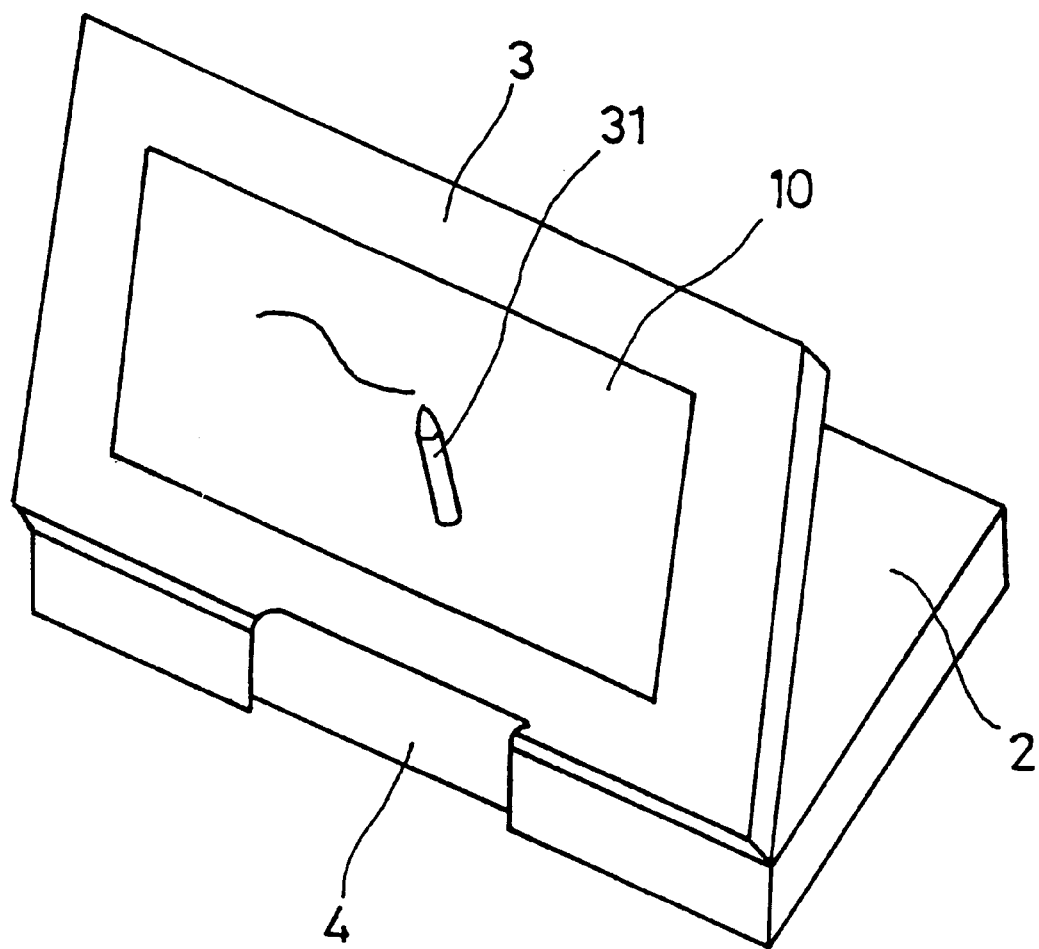
FIG. 9 is a perspective view showing the embodiment of the portable information processing apparatus for explaining a pen input.

FIG. 9 shows a perspective view of the portable information processing apparatus 1 for explaining a pen input from the pen input part 10.

FIG. 9 shows the portable information processing apparatus 1 in a state where the angle γ described above is $0 < \gamma < 90°$. However, the display part 3 may take an upright position ($\gamma = 90°$) or a horizontal position ($\gamma = 0°$) to suit the user's needs. The portable information processing apparatus 1 can be positively maintained in a stable state on a table, a surface having a relatively small area which may be smaller than the bottom surface area of the main body 2, the lap of the user, the palm of the user or the like, because of the relatively small area occupied by the portable information processing apparatus 1 in the state where only the pen input part 10 needs to be enabled and the keyboard 6 may be disabled. As a result, the data input can be made by the user with ease by manipulating a pen 31 with respect to the pen input part 10.

In the embodiment described above, a part of the rotary shaft 21 is fixed to the main body 2 and the rotary shaft 21 is supported by the bearing member 23 in the first rotary part 7. However, it is possible not to fix the rotary shaft 21 to the main body 2. In other words, instead of fixing the rotary shaft 21 to the main body 2, a part of a bearing member 23 may be fixed to the main body 2 and the first rotary part 7 may be formed by such a bearing member and a rotary shaft which is supported by such a bearing member.

Similarly, instead of fixing the rotary shaft 24 to the main body 2, a part of a bearing member 26 may be fixed to the main body 2 and the first rotary part 7 may be formed by such a bearing member and a rotary shaft which is supported by such a bearing member.

In addition, although the display part 3 of the described embodiment includes the liquid crystal display panel 5, the display panel of the display part 3 is not limited to the liquid crystal display panel 5, and other suitable display panels such as a plasma display panel (PDP) may be used in place of the liquid crystal display panel 5.

Further, the present invention is not limited to these embodiments, but various variations and modifications may be made without departing from the scope of the present invention.

What is claimed is:

1. An electronic device, comprising:
   a main body;
   a display part; and
   a connector comprising first and second rotary parts rotatably interconnecting said main body and said display part and affording independent rotation of each thereof in any sequence and through at least 180° relatively to the connector, in each of clockwise and counterclockwise directions, and a range of rotation of the main body relative to the display part of substantially 360°, and thus between fully closed and fully opened positions relatively to each other;
   said first rotary part being linked to said main body so that said connection part and said main body rotate, relatively to each other, when a first rotary manipulation force, greater than a first predetermined value, is applied therebetween; and
   said second rotary part being linked to said display part so that said connection part and said display part rotate, relatively to each other, when a second rotary manipulation force, greater than a second predetermined value, is applied therebetween.

2. The electronic device as claimed in claim 1, wherein said connector connects to respective, confronting edge portions of said main body and said display part.

3. The electronic device as claimed in claim 1, wherein said first rotary part comprises:
   a rotary shaft fixed at a first axial portion thereof to said main body; and
   a bearing member rotatably receiving and engaging a second axial portion of said rotary shaft, friction between said rotary shaft and said bearing member being set so that said rotary shaft rotates relatively to said bearing when said first rotary manipulation force is applied therebetween.

4. The electronic device as claimed in claim 1, wherein said second rotary part comprises:
   a rotary shaft fixed at a first portion thereof to said main body; and
   a bearing member rotatably receiving and engaging a second axial portion said rotary shaft, friction between said rotary shaft and said bearing member being set so that said rotary shaft rotates relatively to said bearing when said second rotary manipulation force is applied therebetween.

5. The electronic device as claimed in claim 1, wherein:
   said first rotary part and said second rotary part of said connection part comprise respective first and second shafts having corresponding, parallel axes of rotation.

6. The electronic device as claimed in claim 1, wherein said first predetermined value is greater than a rotary force due to a weight of said main body itself.

7. The electronic device as claimed in claim 1, wherein said second predetermined value is greater than a rotary force due to a weight of said display part itself.

8. The electronic device as claimed in claim 1, wherein said display part is selected from a group consisting of a liquid crystal display panel and a plasma display panel.

9. An electronic device, comprising:
   a main body having a main surface and an input device received on the main surface;
   a display part; and
   a connector comprising first and second rotary parts rotatably interconnecting said main body and said display part and affording selective, relative rotation therebetween of substantially 360°;
   said first rotary part being linked to said main body so that said connection part and said main body rotate, relatively to each other, when a rotary manipulation force greater than a first predetermined value is applied therebetween;
   said second rotary part being linked to said display part so that said connection part and said display part rotate, relatively to each other, when a rotary manipulation force greater than a second predetermined value is applied therebetween; and
   said main body forms a first angle with respect to said connection part when rotated relatively to said connection part and is tilted by a second angle with respect to a support surface on which the electronic device is placed, in a state where the input device faces in a direction opposite to the support surface and said display part forms a third angle with respect to the support surface, where the third angle is in the range from 0° to 90°.

10. The electronic device as claimed in claim 9, wherein said input device is a keyboard.

11. An electronic device comprising:

a main body having a first main surface with an input device thereon and an opposite, second main surface;

a display part having a first main surface with a display screen thereon and an opposite, second main surface;

a connection part, having a first rotary part and a second rotary part rotatably interconnecting said main body and said display part, said first rotary part being linked to said main body so that said connection part and said main body rotate, relatively to each other, when a first rotary manipulation force, greater than a first predetermined value, is applied therebetween, said second rotary part being linked to said display part so that said connection part and said display part rotate, relatively to each other, when a second rotary manipulation force, greater than a second predetermined value, is applied therebetween; and said main body and said display part are each rotatable with respect to said connection part and relatively to each other to a selected angle between the respective, second main surfaces thereof within an angular range of 0° to 90°.

12. The electronic device as claimed in claim 11, wherein said input device is a keyboard.

13. A portable electronic device, comprising:

a main body having first and second opposite main surfaces and an input device on the first main surface;

a display part having first and second opposite main surfaces and a display panel on the second main surface;

a connector having first and second rotary parts respectively connected to and rotatably interconnecting the main body and the display part and affording independent rotation of each thereof in any sequence and through at least 180° relatively to the connector, in each of clockwise and counterclockwise directions, and a range of rotation of the main body relative to the display part of substantially 360°, and thus between fully closed and fully opened positions relatively to each other;

the first rotary part releaseably maintaining a fixed angular relationship between the main body and the connection part by exerting a first frictional force opposing a first, static rotary manipulation force therebetween produced by the weight of the main body itself and permitting adjustment of the angular relationship when a first, separate rotary manipulation force is applied therebetween which exceeds a combination of the first frictional force and the first, static rotary manipulation forces; and the second rotary part releaseably maintaining a fixed angular relationship between the main body and the connection part by exerting a second frictional force opposing a second, static rotary manipulation force therebetween produced by the weight of the display part itself and permitting adjustment of the angular relationship when a second, separate rotary manipulation force is applied therebetween which exceeds a combination of the second frictional force and the second, static rotary manipulation force.

14. The portable electronic device recited in claim 13, wherein the connector permits relative rotation of the main body and the display part to a selected angle between the respective first main surfaces thereof in a range substantially of from 0° to 360°.

15. The portable electronic device recited in claim 13, wherein the first and second rotary parts define respective first and second, parallel axes of rotation, the parallel axes lying in a common plate parallel to first edges of the main body and display part, the first and second rotary parts affording selective rotations of the main body and the display part about the respective first and second axes, respectively, from an angle of 0° between the respective first main surfaces thereof, corresponding to a closed relationship of the main body and the display part, each thereof through an angle of 180° and in opposite relative directions of rotation, to an angle of 0° between the respective, second main surfaces of the main body and the display part.

16. A portable electronic device, comprising:

a main body having a first and second opposite main surface and an input device on the first main surface and an edge transverse to the first and second main surfaces and a first thickness;

a display part having first and second, opposite main surfaces and a display panel on the first main surface and an edge transverse to the first and second main surfaces and a first thickness;

a connector comprising a first rotary part defining a first axis of rotation and a second rotary part defining a second axis of rotation, parallel to the first axis of rotation and lying in a common plane therewith, the first rotary part being connected to the main body and the main body extending radially from the first axis of rotation and being selectively rotatable about the first axis through 180° from a first position transverse to and extending in a first direction from the common plane to a second position transverse to and extending from the common plane in a second, opposite direction and the second rotary part being connected to the display part and the display part extending radially from the second axis of rotation and being selectively rotatable about the second axis through 180° from a first position transverse to and extending from the common plane in the first direction to a second position transverse to and extending from the common plane in a second, opposite direction, each of the first and second rotary parts being rotatable relatively to the respective axes thereof through at least 180° in each of clockwise and counterclockwise directions, independently of each other and in any sequence, and the connector affording a range of rotation between the main body and the display part of substantially 360°, and thus between fully closed and fully opened positions relatively to each other.

17. A portable electronic device as recited in claim 16, wherein the main body and the display part are rotatable with the respective first and second rotary parts about the respective first and second axes in first and second, opposite senses between the respective first and second positions thereof.

18. An electronic device, comprising:

a main body having a main surface;

a display part; and a connector comprising first and second rotary parts rotatably interconnecting said main body and said display part and affording selective, relative rotation therebetween of substantially 360°;

said first rotary part being lined to said main body so that said connection part and said main body rotate, relatively to each other;

said second rotary part being linked to said display part so that said connection part and said display part rotate, relatively to each other; and said main body forms a first angle with respect to said connection part when rotated relatively to said connection part and is tilted by a second angle with respect to a support surface on which the electronic device is placed, in a state in which the main surface faces in a direction opposite to the support surface and said display part forms a third angle with respect to the support surface, wherein the third angle is in a range from 0° to 90°.

19. The electronic device as claimed in claim 18, wherein said main surface has an input device.

20. The electronic device as claimed in claim 19, wherein said input device is a keyboard.

21. An electronic device comprising:

a main body having a first main surface and a second main surface;

a display part having a first main surface with a display screen thereon and an opposite, second main surface; and a connection part having a first rotary part and a second rotary part rotatably interconnecting said main body and said display part;

said first rotary part being linked to said main body so that said connection part and said main body are rotatable, relatively to each other;

said second rotary part being linked to said display part so that said connection part and said display part are rotatable, relatively to each other;

said main body and said display part each being rotatable with respect to said connection part; and said display part being supported at a second angle between the respective, second main surfaces thereof, wherein the selected angle is greater than 0° and less than or equal to 90°.

22. The electronic device as claimed in claim 21, wherein said first main surface has an input device.

23. The electronic device as claimed in claim 22, wherein said input device is a keyboard.

* * * * *